(12) United States Patent
Fujiwara et al.

(10) Patent No.: US 11,346,085 B2
(45) Date of Patent: May 31, 2022

(54) OBSTACLE DETECTION DEVICE OF CONSTRUCTION MACHINE

(71) Applicant: KOBELCO CONSTRUCTION MACHINERY CO., LTD., Hiroshima (JP)

(72) Inventors: Sho Fujiwara, Hiroshima (JP); Tomofumi Okada, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 58 days.

(21) Appl. No.: 16/771,966

(22) PCT Filed: Nov. 6, 2018

(86) PCT No.: PCT/JP2018/041215
§ 371 (c)(1),
(2) Date: Jun. 11, 2020

(87) PCT Pub. No.: WO2019/130831
PCT Pub. Date: Jul. 4, 2019

(65) Prior Publication Data
US 2021/0214923 A1  Jul. 15, 2021

(30) Foreign Application Priority Data

Dec. 25, 2017  (JP) ............................. JP2017-247683

(51) Int. Cl.
*E02F 9/26*  (2006.01)
*B60Q 9/00*  (2006.01)
(Continued)

(52) U.S. Cl.
CPC .............. *E02F 9/261* (2013.01); *B60Q 9/008* (2013.01); *E02F 9/2033* (2013.01); *E02F 9/24* (2013.01)

(58) Field of Classification Search
CPC . E02F 9/261; E02F 9/2033; E02F 9/24; E02F 9/262; B60Q 9/008
See application file for complete search history.

(56) References Cited

U.S. PATENT DOCUMENTS 9,783,955 B1 * 10/2017 Clar ..................... G05D 1/0219
9,997,075 B2 *  6/2018 Ono ....................... G01S 17/875
(Continued)

FOREIGN PATENT DOCUMENTS

CN  102691332 A   9/2012
CN  105007449 A  10/2015
(Continued)

OTHER PUBLICATIONS

Extended European Search Report dated Jan. 22, 2021 in European Patent Application No. 18894896.2, 8 pages.
(Continued)

*Primary Examiner* — Mussa A Shaawat
(74) *Attorney, Agent, or Firm* — Oblon, McClelland, Maier & Neustadt, L.L.P.

(57) ABSTRACT

An obstacle detection device capable of appropriately setting an area for detecting an obstacle in the vicinity of a machine body of a construction machine in consideration of the state of inclination of the construction machine with respect to its surrounding ground area includes an inclination information acquisition section to obtain inclination information of the machine body with respect to a surrounding ground area in the vicinity of the construction machine, and an area setting section to set a monitoring area for detecting an obstacle, and to modify the monitoring area according to the inclination information.

6 Claims, 11 Drawing Sheets

(51) Int. Cl.
   *E02F 9/20* (2006.01)
   *E02F 9/24* (2006.01)

(56) References Cited

U.S. PATENT DOCUMENTS

| | | | |
|---|---|---|---|
| 10,100,495 B2* | 10/2018 | Takahashi | E02F 9/2232 |
| 10,570,587 B2* | 2/2020 | Kurokami | G06K 9/00597 |
| 11,148,593 B2* | 10/2021 | Izumikawa | G06V 20/58 |
| 11,208,788 B2* | 12/2021 | Izumikawa | E02F 9/2221 |
| 2015/0249821 A1* | 9/2015 | Tanizumi | B66C 13/00 348/46 |
| 2015/0368881 A1 | 12/2015 | Baeumchen | |
| 2016/0224026 A1* | 8/2016 | Hamada | E02F 9/2054 |
| 2016/0237640 A1* | 8/2016 | Carpenter | E02F 9/2833 |
| 2017/0037586 A1* | 2/2017 | Kroll | E02F 9/024 |
| 2017/0067226 A1* | 3/2017 | Takahashi | F15B 13/024 |
| 2017/0073935 A1 | 3/2017 | Friend et al. | |
| 2017/0118915 A1* | 5/2017 | Middelberg | A01D 69/03 |
| 2017/0120820 A1* | 5/2017 | Petzold | G06V 20/56 |
| 2017/0124862 A1* | 5/2017 | Sakai | G01C 21/20 |
| 2017/0298595 A1* | 10/2017 | Machida | E02F 9/24 |
| 2018/0150779 A1* | 5/2018 | Wei | E02F 3/7609 |
| 2018/0163376 A1* | 6/2018 | Redenbo | G05D 1/0212 |
| 2018/0209122 A1* | 7/2018 | Kiyota | E02F 9/24 |
| 2018/0258616 A1* | 9/2018 | Kiyota | H04N 7/18 |
| 2019/0017246 A1* | 1/2019 | Okada | E02F 9/2033 |
| 2019/0211532 A1* | 7/2019 | Sakamoto | B60R 1/00 |
| 2019/0360176 A1* | 11/2019 | Shimoda | E02F 9/261 |
| 2020/0032488 A1* | 1/2020 | Kean | E02F 9/2033 |
| 2020/0032489 A1 | 1/2020 | Yamazaki et al. | |
| 2020/0122540 A1* | 4/2020 | Rife, Jr. | B60G 17/0165 |
| 2020/0167631 A1* | 5/2020 | Rezgui | G06F 8/30 |
| 2020/0202175 A1* | 6/2020 | Hieida | G06T 17/05 |
| 2021/0108378 A1* | 4/2021 | Green | E01C 19/48 |
| 2021/0214923 A1* | 7/2021 | Fujiwara | E02F 9/261 |
| 2021/0238814 A1* | 8/2021 | Engelmann | B62D 55/065 |

FOREIGN PATENT DOCUMENTS

| | | |
|---|---|---|
| CN | 106062823 A | 10/2016 |
| EP | 3 450 636 A1 | 3/2019 |
| JP | 5-65725 A | 3/1993 |
| JP | 2001-262628 A | 9/2001 |
| JP | 2006-257724 A | 9/2006 |
| JP | 2007-181129 A | 7/2007 |
| JP | 2014-6577 A | 1/2014 |
| JP | 2015-81877 A | 4/2015 |
| JP | 2016-79677 A | 5/2016 |
| JP | 2017-78315 A | 4/2017 |
| JP | 2017-201114 A | 11/2017 |
| KR | 10-2009-0069371 A | 7/2009 |

OTHER PUBLICATIONS

International Search Report dated Jan. 29, 2019 in PCT/JP2018/041215 filed Nov. 6, 2018, 2 pages.

Combined Chinese Office Action and Search Report dated Sep. 3, 2021 in corresponding Chinese Patent Application No. 201880082621.5 (with English Translation and English Translation of Category of Cited Documents), 14 pages.

* cited by examiner

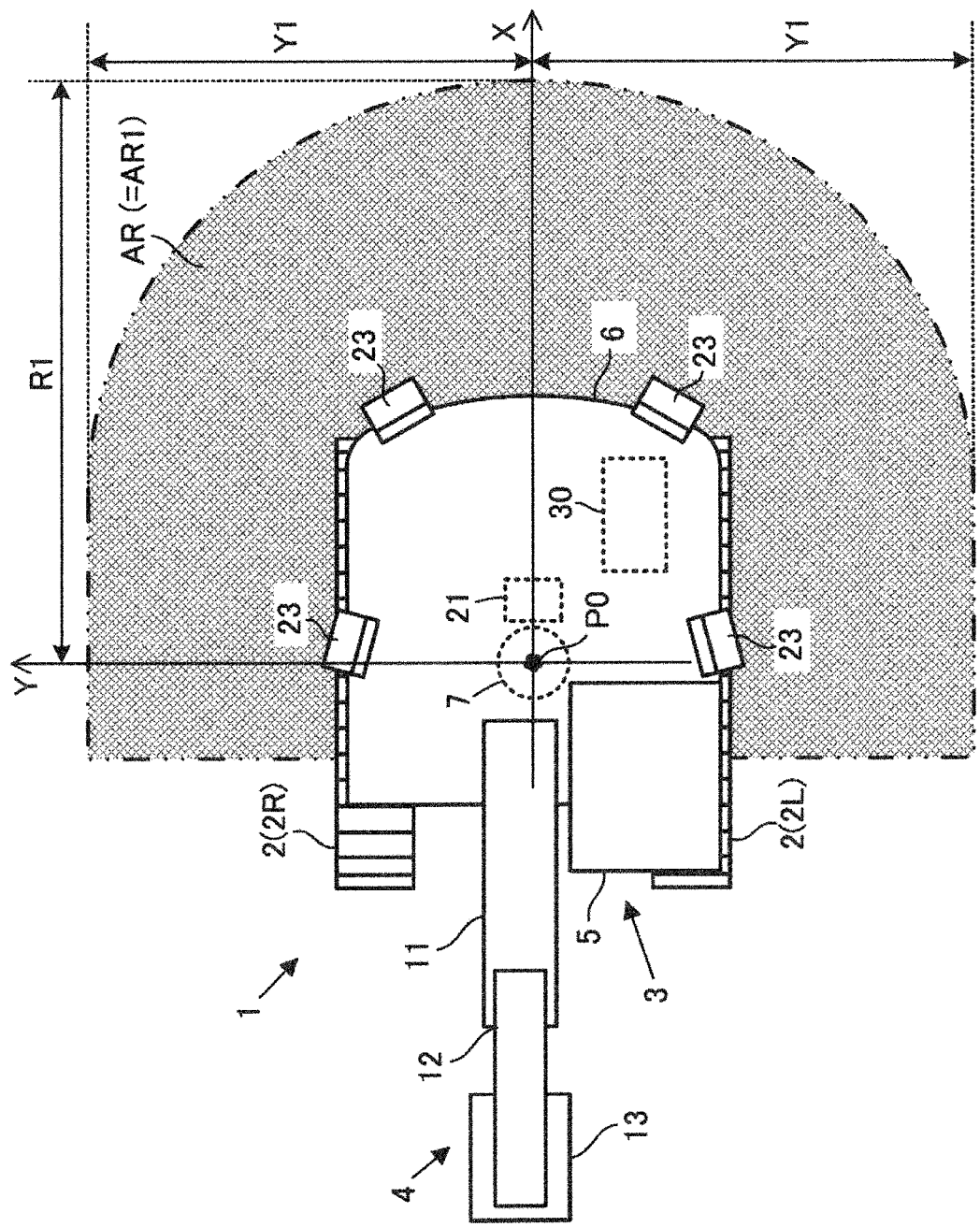

OBSTACLE DETECTION DEVICE OF CONSTRUCTION MACHINE

TECHNICAL FIELD

The present invention relates to an obstacle detection device for use in a construction machine, such as a hydraulic excavator.

BACKGROUND ART

Patent Literatures 1 and 2 disclose examples of conventional obstacle detection devices each for use in a construction machine, such as a hydraulic excavator. The obstacle detection devices disclosed in Patent Literatures 1 and 2 include a means for detecting an obstacle within a predetermined area that is set in the vicinity of a slewing body of the construction machine, and a means for either restricting operation of the hydraulic excavator (either a travel motion of its chassis or a slewing motion of the slewing body) or outputting an alarm according to the detection of the obstacle.

However, in the case where the area of the ground on which the construction machine is located is greatly inclined with respect to its surrounding ground area or when the construction machine is greatly inclined with respect to its surrounding ground area due to, for example, roughness of the ground, the surrounding ground area, which is located relatively close to the construction machine at a side of the machine body (such as the slewing body) of the construction machine, may be detected as an obstacle. Such detection of the surrounding ground area would result in too frequent repetition of restricting the operation of the construction machine or outputting the alarm, reducing the working efficiency.

CITATION LIST

Patent Literature

Patent Literature 1: Japanese Unexamined Patent Publication No. 2001-262628
Patent Literature 2: Japanese Unexamined Patent Publication No. HEI 5-65725

SUMMARY OF INVENTION

It is an object of the present invention to provide an obstacle detection device capable of detecting an obstacle in the vicinity of a machine body of a construction machine and performing handling processing according to a result of the detection, the device enabling proper detection that takes into account the state of inclination of the construction machine with respect to its surrounding ground area. Provided is an obstacle detection device for detecting an obstacle in the vicinity of a machine body of a construction machine and performing handling processing according to a result of the detection, the device comprising: an inclination information acquisition section configured to obtain inclination information that is information about a state of relative inclination of the machine body with respect to a surrounding ground area that is an area of the ground extending in the vicinity of a location ground area that is an area of the ground on which the construction machine is located; an area setting section configured to set a monitoring area in the vicinity of the machine body; an obstacle detection section configured to detect an obstacle within the monitoring area; and a handling processing section configured to perform predetermined handling processing upon detection of the obstacle by the obstacle detection section, wherein the area setting section is configured to modify the monitoring area according to the inclination information.

BRIEF DESCRIPTION OF DRAWINGS

FIG. 1A is a plan view showing a hydraulic excavator and a monitoring area set in the vicinity thereof, the hydraulic excavator serving as an example of a construction machine according to first to fourth embodiments of the present invention.

DESCRIPTION OF EMBODIMENTS

Figure 1B:
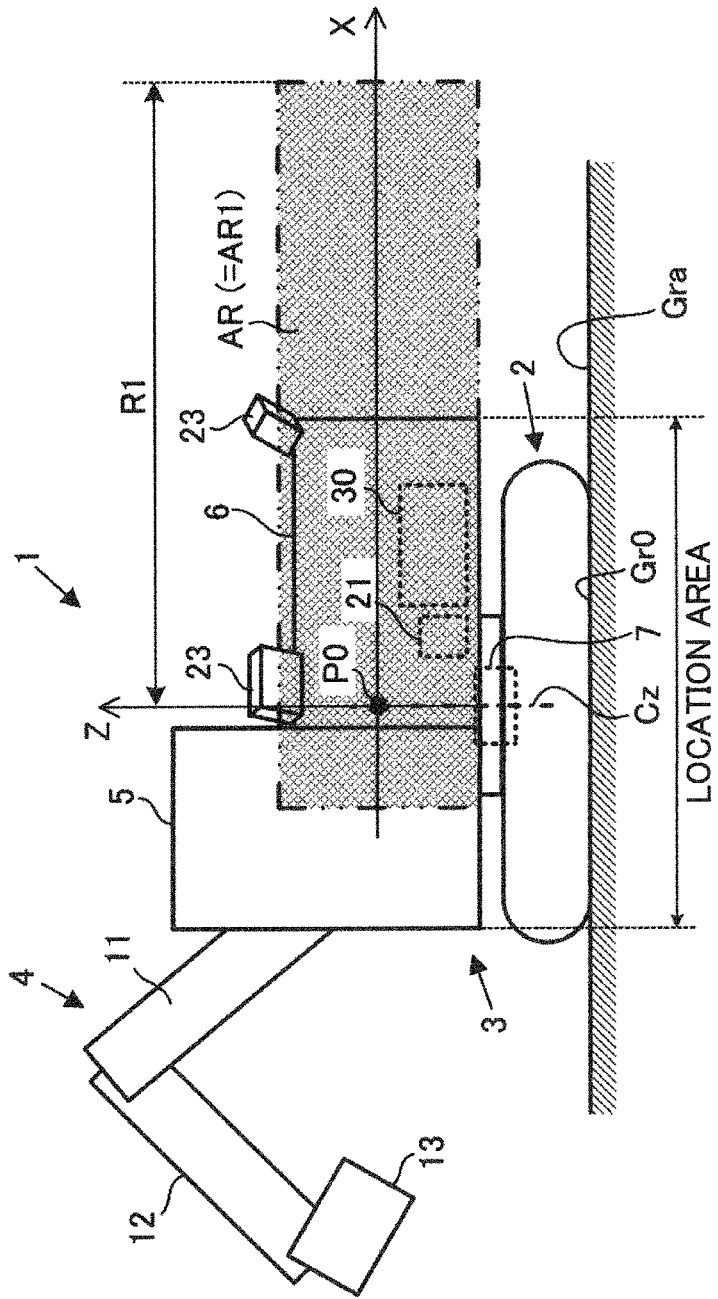
FIG. 1B is a side view showing the hydraulic excavator and the monitoring area shown in FIG. 1A.

A first embodiment of the present invention will be hereinafter described with reference to FIGS. 1A to 5C. FIGS. 1A and 1B show a hydraulic excavator 1 serving as an example of a construction machine according to the first embodiment.

The hydraulic excavator 1 includes a crawler-type chassis 2, a slewing body 3 mounted on the chassis 2, and a working device 4 attached to the slewing body 3.

The chassis 2 includes an unillustrated travel frame and a pair of crawler tracks 2L and 2R disposed on the left and right sides of the travel frame. The pair of crawler tracks 2L and 2R can be independently driven by respective travel hydraulic motors (not shown).

The slewing body 3 is mounted on the chassis 2 via a slewing device 7 in such a way as to be able to slew with respect the chassis 2 in a yaw direction, which is a rotational direction about a slewing axis Cz extending in a vertical direction. The slewing device 7 includes an unillustrated slewing hydraulic motor and slewing gear, and causes the slewing body 3 to slew with a drive force generated by the stewing hydraulic motor. The stewing body 3 has at its front portion an operator's cab 5 for allowing an operator to be seated therein and at its rear portion a machine chamber 6 for housing, for example, an engine and hydraulic devices. In the first embodiment, the stewing body 3 corresponds to the machine body of the hydraulic excavator 1 (the construction machine).

The working device 4 includes a boom 11 extending from and coupled to the front portion of the stewing body 3, an arm 12 extending from and coupled to a distal end of the boom 11, and an attachment 13 attached to a distal end of the arm 12. The boom 11, the arm 12, and the attachment 13 can be pivoted by their respective unillustrated hydraulic cylinders with respect to the stewing body 3, the boom 11, and the arm 12, respectively, in a pitch direction (a rotational direction about an axis extending in a left and right direction of the stewing body 3).

The present invention is not necessarily applied to the construction machine in the form of the hydraulic excavator 1 shown in FIG. 1, For example, the boom 11 may be configured to be pivotable not only in the pitch direction with respect to the stewing body 3 but also in the yaw direction with respect to the stewing body 3 or movable in the left and right direction of the stewing body 3. Further, the present invention can be applied to construction machines of other types than the hydraulic excavator.

The chassis 2 is not necessarily of the crawler type, but may be of a wheel type. Further, the actuators included in the hydraulic excavator 1 are not necessarily of the hydraulic type. The hydraulic excavator 1 may alternatively include electric actuators.

Figure 2:
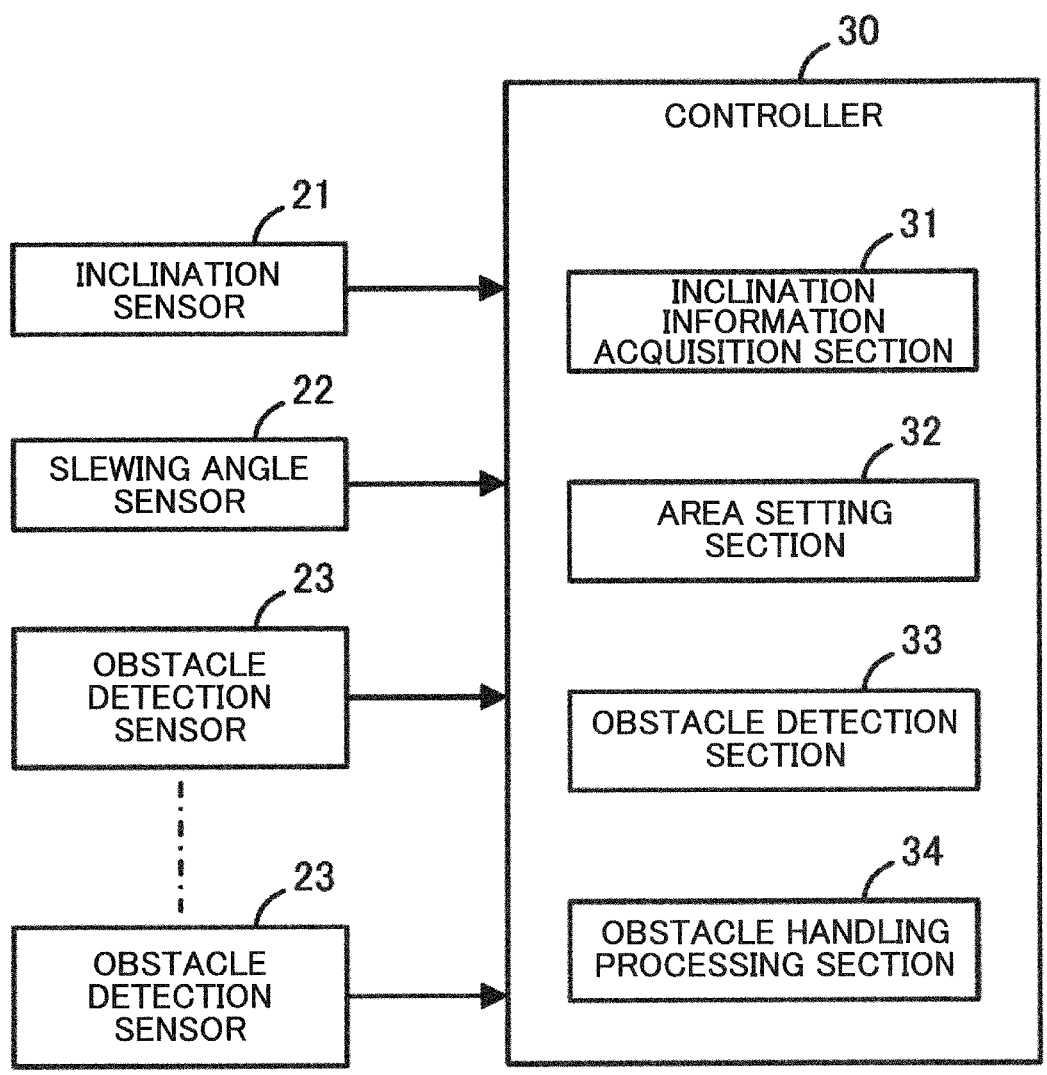
FIG. 2 is a block diagram of an obstacle detection device according to the first to third embodiments of the present invention.

The hydraulic excavator 1 according to the first embodiment includes an inclination sensor 21 as shown in FIG. 2, a stewing angle sensor 22, a plurality of obstacle detection sensors 23, and a controller 30 mounted thereon.

The inclination sensor 21 detects the inclination of the stewing body 3 with respect to a horizontal plane. The inclination sensor 21 according to the first embodiment is in the form of a known sensor capable of detecting the inclination angles about two detection axes and generating a inclination detection signal indicating the detected inclination angles, and is mounted on the slewing body 3 in such a way as to be able to detect the inclination of the slewing body 3 with respect to the horizontal plane. More specifically, the two detection axes according to the first embodiment include, as shown in FIGS. 1A and 1B, an X-axis extending in a front and rear direction of the slewing body 3 and a Y-axis extending in the left and right direction of the slewing body 3, and the inclination sensor 21 is mounted on the slewing body 3 in such a way as to be able to detect each of the inclination angles of the slewing boy 3 about the X-axis and about the Y-axis.

The inclination of the slewing body 3 according to the first embodiment coincides with or substantially coincides with the inclination of the chassis 2 and, therefore, the inclination sensor 21 may be mounted on the travel frame of the chassis 2 in such a way as to be able to detect the inclination of the chassis 2 with respect to the horizontal plane.

The slewing angle sensor 22 detects the slewing angle of the slewing body 3 with respect to the chassis 2. The slewing angle sensor 22 is in the form of a rotary encoder, a potentiometer, or a resolver, for example, and is assembled to the slewing device 7, for example (not shown in FIG. 1).

Each of the obstacle detection sensors 23 is provided for detecting an object in the vicinity of the slewing body 3, and is in the form of a known range finder sensor or a stereo camera, for example. The obstacle detection sensors 23 are attached to a peripheral portion of the slewing body 3 at a plurality of positions (for example, four positions in the example shown in FIG. 1A) so as to be able to detect an object (for example, a moving object, such as a person, or an installed object) in the vicinity of the slewing body 3 and the distance and direction thereof (or the relative position thereof with respect to the slewing body 3).

The plurality of obstacle detection sensors 23 can detect an object within an area including at least a monitoring area AR that is set in the vicinity of the slewing body 3 in the manner described later. The monitoring area AR serves as an area that allows an obstacle detection section 33 described later to detect an object present therein as an obstacle (an object that is liable to come into contact with the stewing body 3).

In the first embodiment, the monitoring area AR is an area set in the vicinity of the slewing body 3, which is relatively close to the slewing body 3 and which preferably cannot or is difficult to be visually recognized or can be easily overlooked by the operator of the hydraulic excavator 1. For example, the monitoring area AR is an area set to extend along the left, right, and rear sides of the slewing body 3 within a predetermined extent from the outer peripheral surface of the slewing body 3. The plurality of (the four in the shown example) obstacle detection sensors 23 attached to the slewing body 3 are disposed such that at least one of the obstacle detection sensors 23 surely detects an object within the monitoring area AR.

The monitoring area AR shown in FIGS. 1A and 1B is equal to a reference area AR1 that is a monitoring area set on the assumption that the hydraulic excavator 1 is operated on an area of the ground that allows the inclination of the slewing body 3 to be kept substantially constant or change relatively slowly, the reference area AR1 having a predetermined size and shape with respect to the slewing body 3.

The reference area AR1 is, as shown in FIG. 1A, an area having a half oval shape symmetrical about a line passing through the center of the width of the slewing body 3 in the left and right direction (in the Y-axis direction shown in FIG. 1A) as viewed from above the hydraulic excavator 1, and has, as shown in FIG. 1B, a constant dimension in a height direction (in the direction of the slewing axis Cz) of the hydraulic excavator 1.

In cases where the hydraulic excavator 1 is operated on an area of the ground that can easily change the inclination of the slewing body 3 due to the roughness or undulation or a change in the slope of the ground in the operational environment of the hydraulic excavator 1, it is preferable to appropriately modify the monitoring area AR from the reference area AR1 in size and shape. On the other hand, the reference area AR1 does not necessarily have the shape shown in FIGS. 1A and 1B, but may be formed in various shapes according to the outer shape of the slewing body 3, for example.

The controller 30 is composed of one or more electronic circuit units having a microcomputer, a memory and an interface circuit, for example, and functions to perform various control operations and arithmetic operations. The controller 30 receives various sensing data including detection data generated by each of the inclination sensor 21, the stewing angle sensor 22, and the obstacle detection sensors 23.

The controller 30 includes, as functions realized by the embedded hardware and programs (software), functions corresponding to the elements constituting the obstacle detection device. More specifically, the controller 30 functionally includes an inclination information acquisition section 31, an area setting section 32, the obstacle detection section 33, and an obstacle handling processing section 34.

As described in detail later, the inclination information acquisition section 31 calculates the estimated value of the relative inclination of the slewing body 3 with respect to the surrounding ground area of the hydraulic excavator 1 based on the inclination detection signal generated by the inclination sensor 21 during operation of the hydraulic excavator 1, i.e. the detection data indicating the relative inclination, and obtains the calculated estimated value as inclination information. In this manner, the inclination information acquisition section 31 obtains the inclination information, which is information about the state of relative inclination of the slewing body 3 with respect to the surrounding ground area of the hydraulic excavator 1.

Here, the surrounding ground area of the hydraulic excavator 1 refers, more specifically, to an area of the ground extending in the vicinity of a location ground area that is an area of the ground on which the hydraulic excavator 1 is located. In other words, the location ground area is an area of the ground directly under the hydraulic excavator 1 when the hydraulic excavator 1 is viewed from above in the direction of the slewing axis Cz. Specifically, in the first embodiment, when the hydraulic excavator 1 is viewed from above in the direction of the slewing axis Cz, an area of the ground directly under the whole of the slewing body 3 (i.e. an area of the ground occupied by the whole of the slewing body 3 as viewed in the direction of the slewing axis Cz) and an area of the ground on which the chassis 2 is placed are considered as a location area of the hydraulic excavator 1, and the area of the ground extending over the location area is considered as the location ground area, i.e. "the area of the ground on which the hydraulic excavator 1 is located", for example.

On the other hand, an area of the ground outside the location ground area that is close to the location area of the hydraulic excavator 1 (for example, an area of the ground outside the location ground area that is within a predetermined distance from the slewing axis Cz or the outer peripheral surface of the slewing body 3) is regarded as the surrounding ground area of the hydraulic excavator 1.

In the description hereinafter, the location ground area (the area of the ground on which the hydraulic excavator 1 is located) is denoted by the reference character "Gr0" and the surrounding ground area is denoted by the reference character "Gra", as shown in FIG. 1B.

The area setting section 32 variably sets the monitoring area AR in the vicinity of the slewing body 3. Specifically, as described in detail later, the area setting section 32 sets the monitoring area AR based on the inclination information (the estimated value of the relative inclination of the slewing body 3 with respect the surrounding ground area Gra of the hydraulic excavator 1) obtained by the inclination information acquisition section 31 during the operation of the hydraulic excavator 1. The monitoring area AR is set not to include the surrounding ground area Gra.

The obstacle detection section 33 detects an object detected by the plurality of obstacle detection sensors 23 that is present within the monitoring area AR as an obstacle. Specifically, the obstacle detection section 33 identifies the position (the relative position with respect to the slewing body 3) of an object in the vicinity of the slewing body 3 based on the detection data generated by the obstacle detection sensors 23 during the operation of the hydraulic excavator 1, and determines whether the identified position is within the monitoring area AR set by the area setting section 32. When having determined that the position of the object is within the monitoring area AR, the obstacle detection section 33 identifies the object as the obstacle, and inputs to the obstacle handling processing section 34 obstacle detection information indicating presence of the obstacle within the monitoring area AR. The obstacle detection information can include information relating to the position of the obstacle within the monitoring area AR.

The obstacle handling processing section 34 performs, when an obstacle has been detected within the monitoring area AR, predetermined handling processing according to the detection. Specifically, upon receiving the obstacle detection information from the obstacle detection section 33 during the operation of the hydraulic excavator 1, the obstacle handling processing section 34 performs handling processing corresponding to the obstacle detection information. The handling processing includes at least one of a control operation of restricting at least either a slewing motion of the slewing body 3 or a travel motion of the chassis 2 of the hydraulic excavator 1 and a warning operation of providing a warning to the operator of the hydraulic excavator 1 or a person in the vicinity of the hydraulic excavator 1.

The restriction operation refers to, for example, an operation of prohibiting or forcibly stops the operation of the travelling hydraulic motor that causes rearward travel of the chassis 2 in the case where the obstacle is present at the rear of the chassis 2. Alternatively, the restriction operation may refer to an operation of decelerating the travel velocity of the chassis 2 at a rate according to, for example, the distance between the obstacle and the hydraulic excavator 1.

The restriction operation refers to, for example, an operation of prohibiting or forcibly stops the operation of the slewing device 7 that causes slewing motion of the slewing body 3 in the case where the obstacle is present at a side of the slewing body 3. Alternatively, the restriction operation may refer to an operation of decelerating the stewing velocity of the slewing body 3 at a rate according to, for example, the distance or positional relationship between the obstacle and the stewing body 3.

The warning operation may refer to, for example, an operation of providing a warning to the operator of the hydraulic excavator 1 or a person in the vicinity of the hydraulic excavator 1. The warning may be in the form of a visual warning message or an audible warning message.

The content of the warning message may be varied according to, for example, the positional relationship between the hydraulic excavator 1 and the obstacle. Alternatively, one of the operation of restricting the travel motion of the chassis 2, the operation of restricting the slewing motion of the slewing body 3, and the warning operation may be appropriately selected and performed according to, for example, the positional relationship between the hydraulic excavator 1 and the obstacle or the operational state of the hydraulic excavator 1.

Next, the processing performed by the inclination information acquisition section 31 and the processing performed by the area setting section 32 will be further described in detail. The description hereinafter uses the term "slewing body coordinate system", which refers to a coordinate system with the coordinate axes consisting of the above-mentioned X-axis and the Y-axis and a Z-axis orthogonal to both the X-axis and the Y-axis (the Z-axis extending in the direction of the slewing axis Cz).

In the first embodiment, the processing of the inclination information acquisition section 31 and the processing of the area setting section 32 are performed in the manner described below, for example, when an operational environment ground area that is an area of the ground serving as the operational environment of the hydraulic excavator 1, i.e. an area of the ground consisting of the location ground area. Gr0 and the surrounding ground area Gra, can be considered to be substantially flat, excluding partial roughness or undulation, for example (when a large part of the operational environment ground area can be considered to lie on or close to a single reference plane).

The inclination information acquisition section 31 performs, before the start of operation of the hydraulic excavator 1, an initial setting operation of calculating data indicating average (or typical) inclination of the operational environment ground area and storing the calculated data in a predetermined region of the controller 30.

The initial setting operation refers, more specifically, to an operation performed when the hydraulic excavator 1 is in a stopped state on a flat part of the operational environment ground area, the operation including obtaining detection data indicating the detected value of current inclination (the inclination angles about the X-axis and the Y-axis) of the slewing body 3 in response to a predetermined manipulation of a control device (not shown) disposed, for example, in the operator's cab 5 of the hydraulic excavator 1 performed by, for example, the operator or in response to a command given by, for example, an external server, the detection data being obtained in the form of the inclination detection signal input from the inclination sensor 21, and storing the detection data in the predetermined region of the controller 30 as the data indicating the average (or typical) inclination of the operational environment ground area (hereinafter, the average inclination will be referred to as "ground reference inclination"). In the initial setting operation, the inclination information acquisition section 31 also stores data indicating the detected value of a current slewing angle of the slewing body 3 together with the detection data indicating the ground reference inclination.

The initial setting operation may alternatively refers to an operation of obtaining and storing, instead of the detection data indicating the ground reference inclination detected by the inclination sensor 21, measurement data indicating the ground reference inclination measured by any external measuring device. In addition, when the ground reference inclination is zero or close to zero (when the operational environment ground area can be considered to be substantially flat), the storing of the data indicating the detected value of the slewing angle of the slewing body 3 in the controller 30 may be omitted in the initial setting operation.

In the first embodiment, operation of the hydraulic excavator 1 is performed after the above-described initial setting operation and, during the operation of the hydraulic excavator 1, the following operations of the inclination information acquisition section 31 and the area setting section 32 are successively performed at a predetermined arithmetic processing cycle, as described below.

In each arithmetic processing cycle, the inclination information acquisition section 31 obtains the detected value of current inclination of the slewing body 3 indicated by the detection data included in the inclination detection signal input from the inclination sensor 21, together with the detected value of a current slewing angle of the slewing body 3. Subsequently, the inclination information acquisition section 31 changes the above-mentioned ground reference inclination to the inclination viewed in the slewing body coordinate system that corresponds to the current slewing angle of the slewing body 3, according to the difference between the detected value of the current slewing angle of the slewing body 3 and the value of the slewing angle of the slewing body 3 stored in the controller 30 in the initial setting operation.

Subsequently, the inclination information acquisition section 31 calculates the relative inclination (a pair of the relative inclination angle about the X-axis and the relative inclination angle about the Y-axis), i.e. the difference between the detected value of the current inclination angle of the stewing body 3 and the changed ground reference inclination, as the estimated value of current relative inclination of the stewing body 3 with respect to the surrounding ground area Gra of the hydraulic excavator 1.

In other words, the inclination information acquisition section 31 calculates the estimated value of the relative inclination serving as the inclination information indicating the state of inclination of the stewing body 3 with respect to the surrounding ground area Gra, on the assumption that the inclination of the surrounding ground area of the hydraulic excavator 1 coincides (or substantially coincides) with the changed ground reference inclination.

Here, in the first embodiment, since the operational environment ground area can be considered to be substantially flat, the surrounding ground area Gra is likely to have inclination substantially equal to the ground reference inclination. Thus, the inclination of the surrounding ground area Gra of the hydraulic excavator 1 can be considered to coincide with (or substantially coincide with) the ground reference inclination.

When the ground reference inclination is zero or close to zero, the detected value of the inclination of the stewing body 3 indicated by the detection data transmitted from the inclination sensor 21 may be obtained directly as the estimated value of the relative inclination.

In the first embodiment, the area setting section 32 sets the monitoring area AR according to the relative inclination (estimated value) obtained by the inclination information acquisition section 31 in the above-described manner.

Here, when the relative inclination is small (when both the relative inclination angle about the X-axis and the relative inclination angle about the Y-axis are small), the inclination of the slewing body 3 with respect to the surrounding ground area Gra is small. Thus, setting monitoring area AR to the reference area AR1 will not result in inclusion of the surrounding ground area Gra in the monitoring area AR.

Accordingly, the area setting section 32 sets the monitoring area AR to the reference area AR1 when the degree (absolute value) of each of the relative inclination angles about the X-axis and the Y-axis is less than or equal to a predetermined threshold value. For example, when the location ground area Gr0, which is the area of the ground extending over the location area of the hydraulic excavator 1, and the surrounding ground area Gra are flat, being flush with each other (or substantially flush with each other) as shown in FIGS. 1A and 1B, the monitoring area AR is set to the reference area AR1.

The threshold value is set for each of the relative inclination angle about the X-axis and the relative inclination angle about the Y-axis. These threshold values are set in advance based on simulation, for example, such that the plane corresponding to the surrounding ground area Gra is out of the reference area AR1 (such that the plane does not coincide with the reference area AR1) when each of the relative inclination angle about the X-axis and the relative inclination angle about the Y-axis is less than or equal to its respective threshold value.

The situation in which each of the relative inclination angles about the X-axis and the Y-axis is less than or equal to its respective threshold value includes the first case according to the present invention.

Figure 3:
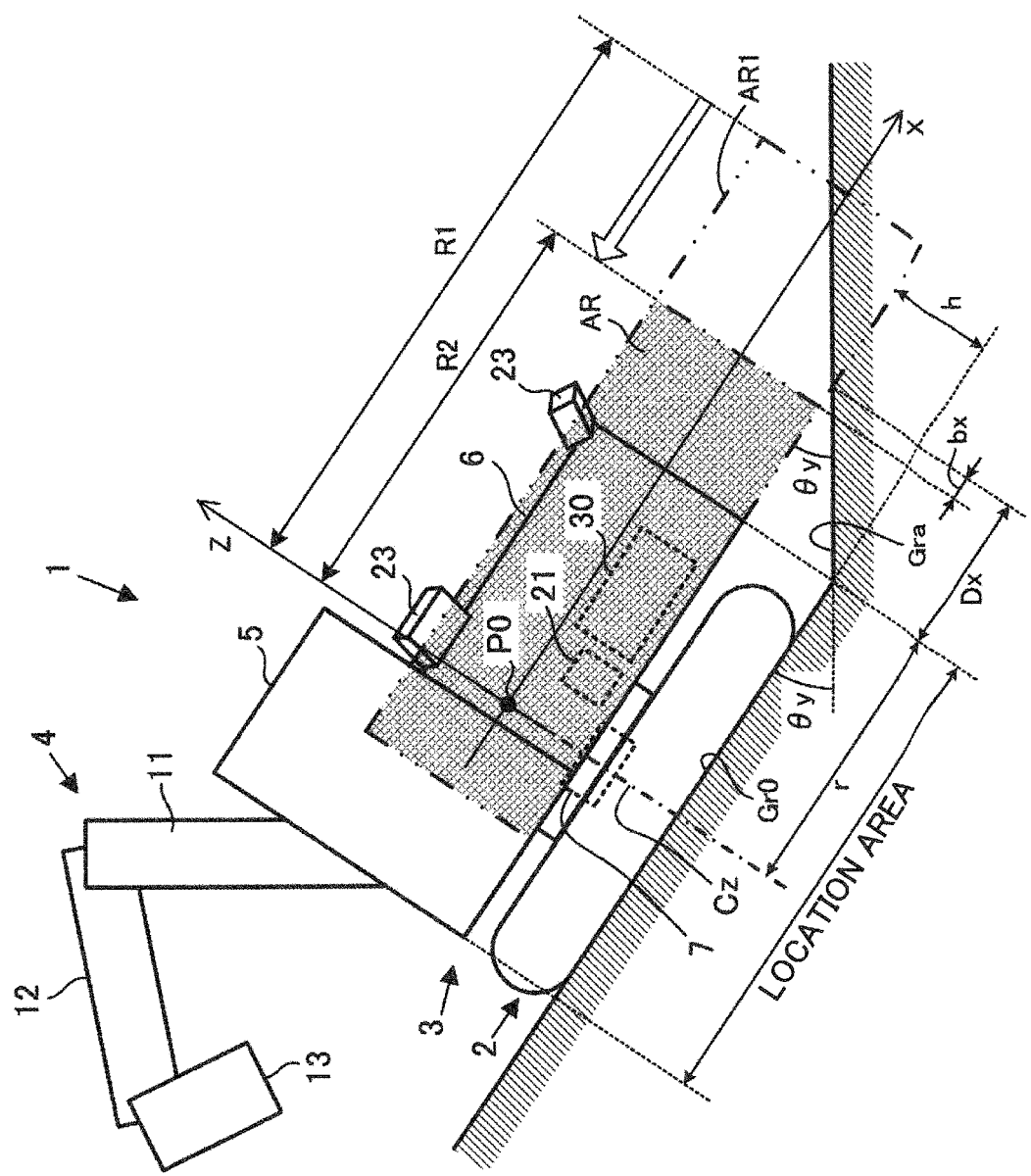
FIG. 3 is a side view showing the monitoring area set when the hydraulic excavator is greatly inclined with respect to its surrounding ground area in the first embodiment.
Figure 4:
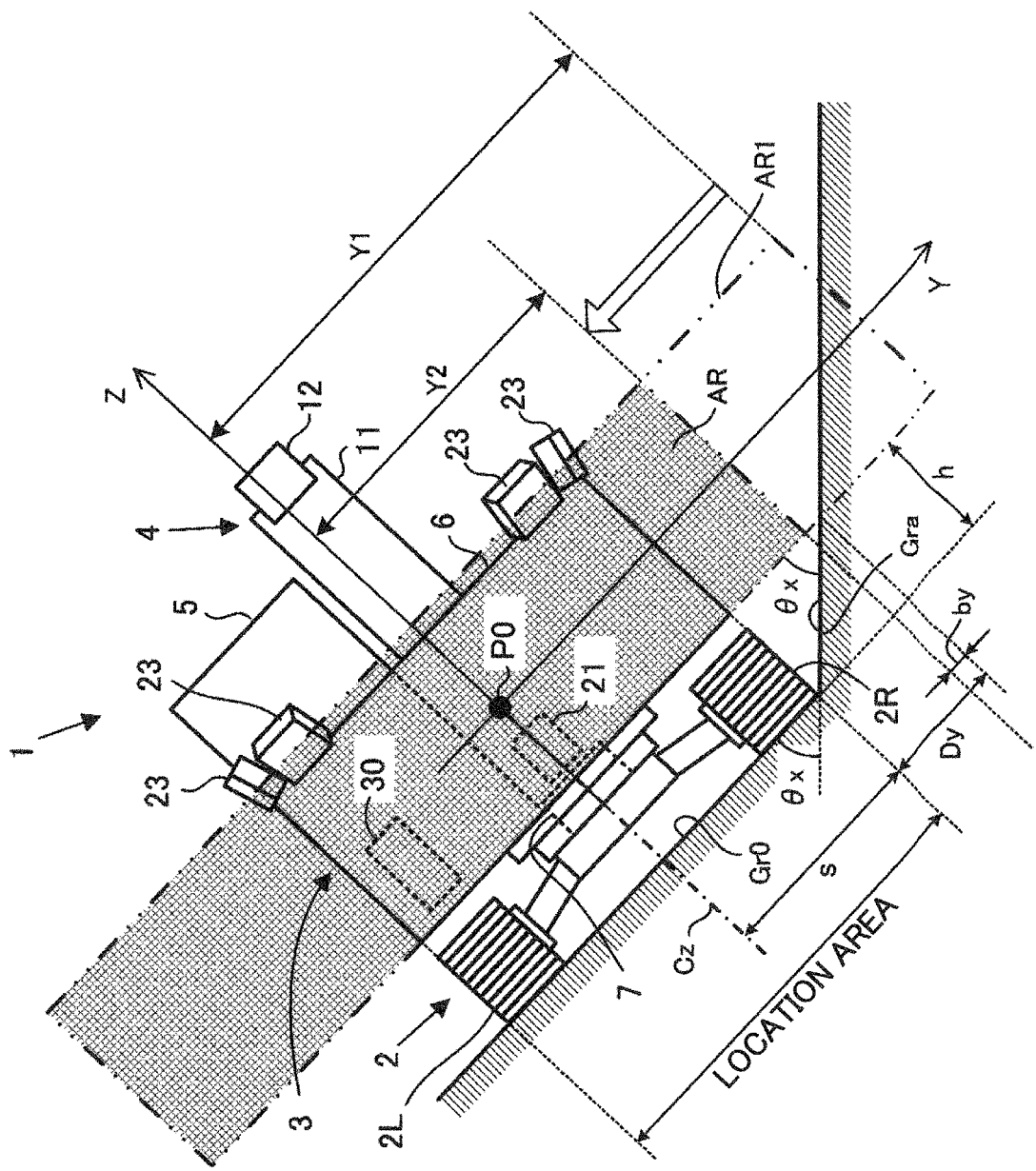
FIG. 4 is a front view showing the monitoring area set in the state shown in FIG. 3.

In contrast, when at least one of the relative inclination angles about the X-axis and the Y-axis is greater than its respective threshold value, setting the monitoring area AR to the reference area AR1 may result in inclusion of the surrounding ground area Gra in the monitoring area AR. FIGS. 3 and 4 show an example of such situation. Such situation in which at least one of the relative inclination angles about the X-axis and the Y-axis is greater than its respective threshold value corresponds to the second case according to the present invention.

If the monitoring area AR is set to the reference area AR1 in the second case, the obstacle detection section 33 may detect the surrounding ground area Gra as an obstacle.

Accordingly, when at least one of the relative inclination angles about the X-axis and the Y-axis is greater than its respective threshold value, the area setting section 32 according to the first embodiment sets the monitoring area AR such that the surrounding ground area Gra is excluded from the monitoring area AR. Specifically, the area setting section 32 determines the dimension of the monitoring area AR in the X-axis direction according to the estimated value of the relative inclination angle θy about the Y-axis and determines the dimension of the monitoring area AR in the Y-axis direction according to the estimated value of the relative inclination angle θx about the X-axis, as described below.

Although the location ground area Gr0 shown in FIG. 3 has a flat slope, the location ground area Gr0 does not necessarily have the flat slope. For example, the slewing body 3 can be inclined with respect to the surrounding ground area Gra in the same manner as shown in FIG. 3 by, for example, the front portion of the chassis 2 running onto a raised portion of the ground.

Further, although the front and rear direction of the chassis 2 and the front and rear direction (the X-axis direction) of the slewing body 3 are shown as extending in the same direction in FIG. 3, the slewing body 3 may be in a position stewed with respect to the chassis 2 about the slewing axis Cz at any slewing angle.

These points also apply to the situation shown in FIG. 4 or the situations shown in FIGS. 6 and 7 according to a second embodiment described later.

The area setting section 32 according to the first embodiment determines the dimension of the monitoring area AR in the X-axis direction according to the relative inclination angle θy (estimated value) about the Y-axis, as follows. When the relative inclination angle θy about the Y-axis is an angle that brings the rear portion of the slewing body 3 closer to the surrounding ground area Gra as shown in FIG. 3, the area setting section 32 calculates, using the estimated value of the relative inclination angle θy about the Y-axis, a minimum distance (a minimum distance in the X-axis direction) Dx from the rear edge of the slewing body 3 to the surrounding ground area Gra when the hydraulic excavator 1 is viewed in the Y-axis direction (when the hydraulic excavator 1 is plotted on the ZX-coordinate plane of the slewing body coordinate system).

In the first embodiment, the surrounding ground area Gra when the hydraulic excavator 1 is viewed in the Y-axis direction (when the hydraulic excavator 1 is plotted on the ZX-coordinate plane of the slewing body coordinate system) is considered to, as shown in FIG. 3, lie on a straight line extending from the rear edge of the location ground area Gr0 at an angle inclined with respect to the X-axis direction, the angle being coincident with the relative inclination angle θy.

In this case, the minimum distance Dx can be calculated using the following formula (1) wherein the symbol h represents the height (fixed value) from the lower edge of the chassis 2 to the lower edge of the slewing body 3, as shown in FIG. 3.

$$Dx = h/\tan(\theta y) \quad (1)$$

The height h is stored in the controller 30 in advance. The minimum distance Dx can alternatively be obtained, for example, based on the estimated value of the relative inclination angle θy about the Y-axis, using a data table prepared in advance, for example.

Subsequently, the area setting section 32 determines a distance R2 from a reference point P0 to the rear edge of the monitoring area AR to be set, using the following formula (2a) or formula (2b) according to the relative magnitudes of the value (=r+Dx) obtained by adding the above-calculated minimum distance Dx to a distance r from the reference point P0 to the rear edge of the slewing body 3 in the X-axis direction and a distance R1 from the reference point P0 to the rear edge of the reference area AR1.

$$\text{When } r+Dx > R1: R2 = R1 \quad (2a)$$

$$\text{When } r+Dx \leq R1: R2 = r+Dx-bx \quad (2b)$$

The symbol bx in the above-listed formula (2b) represents a margin constant having a predetermined positive value (bx>0). The values of the distance r, R1 and the margin constant bx are stored in the controller 30 in advance.

The reference point P0 is set in the slewing body 3 in advance and can be set to any position. For example, the reference point P0 shown in FIG. 1A is set on the line passing through the center of the width of the slewing body 3 in the left and right direction (on the X-axis in FIG. 1A) when the hydraulic excavator 1 is viewed from above. The reference point P0 may alternatively be set to a position away from the slewing axis Cz in the X-axis direction.

When r+Dx>R1, the minimum distance Dx from the rear edge of the slewing body 3 to the surrounding ground area Gra when the hydraulic excavator 1 is viewed in the Y-axis direction is greater than the distance (=R1−r) from the rear edge of the slewing body 3 to the rear edge of the reference area AR1. In this case, based on the above-listed formula (2a), the distance R2 from the reference point P0 to the rear edge of the monitoring area AR to be set is set to the same value as the distance R1 associated with the reference area AR1.

On the other hand, when r+Dx≤R1, the minimum distance Dx from the rear edge of the slewing body 3 to the surrounding ground area Gra when the hydraulic excavator 1 is viewed in the Y-axis direction is equal to or less than the distance (=R1−r) from the rear edge of the slewing body 3 to the rear edge of the reference area AR1. In this case, based on the above-listed formula (2b), the distance R2 from the reference point P0 to the rear edge of the monitoring area AR to be set is set to a value obtained by adding to the distance r from the reference point P0 to the rear edge of the slewing body 3 a value (=Dx bx) obtained by subtracting the value of the margin constant bx from the minimum distance Dx from the rear edge of the slewing body 3 to the surrounding ground area Gra. In other words, the distance (=R2−r) from the rear edge of the slewing body 3 to the rear edge of the monitoring area AR is set to a distance (=Dx−bx) slightly less than the minimum distance Dx from the rear edge of the slewing body 3 to the surrounding ground area Gra.

When the relative inclination angle θy about the Y-axis is an angle that brings the rear portion of the slewing body 3 away from the surrounding ground area Gra (is an angle that brings the front portion of the slewing body 3 closer to the surrounding ground area Gra), the area setting section 32 sets the distance R2 associated with the monitoring area AR to the same value as the distance R1 associated with the reference area AR1.

In both of the above-mentioned cases, the distance from the reference point P0 to the front edge of the monitoring area AR is set to the same value as the distance R1 associated with the reference area AR1.

The area setting section 32 determines the dimension of the monitoring area AR in the Y-axis direction according to the relative inclination angle θx (estimated value) about the X-axis, as follows. When the relative inclination angle θx about the X-axis is an angle that brings one of the left and right sides, for example, the right side, of the slewing body 3 closer to the surrounding ground area Gra as shown in FIG. 4, the area setting section 32 calculates, using the estimated value of the relative inclination angle θx about the X-axis, a minimum distance (a minimum distance in the Y-axis direction) Dy from the right edge of the slewing body 3 to the surrounding ground area Gra when the hydraulic excavator 1 is viewed in the X-axis direction (when the hydraulic excavator 1 is plotted on the YZ-coordinate plane of the slewing body coordinate system).

In the first embodiment, the surrounding ground area Gra when the hydraulic excavator 1 is viewed in the X-axis direction (when the hydraulic excavator 1 is plotted on the YZ-coordinate plane of the slewing body coordinate system) is considered to, as shown in FIG. 4, lie on a straight line extending from the right edge of the location ground area Gr0 at an angle inclined with respect to the Y-axis direction, the angle being coincident with the relative inclination angle θx.

In this case, the minimum distance Dy can be calculated using the following formula (3).

$$Dy=h/\tan(\theta x) \quad (3)$$

The minimum distance Dy can alternatively be obtained, for example, based on the estimated value of the relative inclination angle θx about the X-axis, using a data table prepared in advance, for example.

Subsequently, the area setting section 32 determines a distance Y2 from the reference point P0 to the right edge of the monitoring area AR to be set, using the following formula (4a) or formula (4b) according to the relative magnitudes of the value (=s+Dy) obtained by adding the above-calculated minimum distance Dy to a distance s from the reference point P0 to the right edge of the slewing body 3 in the Y-axis direction and a distance Y1 from the reference point P0 to the right edge of the reference area AR1.

$$\text{When } s+Dy>Y1: Y2=Y1 \quad (4a)$$

$$\text{When } s+Dy\leq Y1: Y2=s+Dy-by \quad (4b)$$

The symbol by in the above-listed formula (4b) represents a margin constant having a predetermined positive value (by >0). The values of the distance s, Y1 and the margin constant are stored in the controller 30 in advance. The value of the margin constant by may be the same as or different from the value of the margin constant bx in the above-mentioned formula (2b).

When s+Dy>Y1, the minimum distance Dy from the right edge of the slewing body 3 to the surrounding ground area Gra when the hydraulic excavator 1 is viewed in the X-axis direction is greater than the distance from the right edge of the slewing body 3 to the right edge of the reference area AR1. In this case, based on the above-listed formula (4a), the distance Y2 from the reference point P0 to the right edge of the monitoring area AR to be set is set to the same value as the distance Y1 associated with the reference area AR1.

On the other hand, when s+Dy≤Y1, the minimum distance Dy from the right edge of the slewing body 3 to the surrounding ground area Gra when the hydraulic excavator 1 is viewed in the X-axis direction is equal to or less than the distance from the right edge of the slewing body 3 to the right edge of the reference area AR1. In this case, based on the above-listed formula (4b), the distance Y2 from the reference point P0 to the right edge of the monitoring area AR to be set is set to a value obtained by adding to the distance s from the reference point P0 to the right edge of the stewing body 3 a value (=Dy by) obtained by subtracting the value of the margin constant by from the minimum distance Dy from the right edge of the stewing body 3 to the surrounding ground area Gra. In other words, the distance (=Y2-s) from the right edge of the stewing body 3 to the right edge of the monitoring area AR is set to a distance (=Dy-by) slightly less than the minimum distance Dy from the right edge of the stewing body 3 to the surrounding ground area Gra.

On the other hand, the distance (in the Y-axis direction) from the reference point P0 to the left edge of the monitoring area AR is set to the distance associated with the reference area AR1 (the distance Y1 in the first embodiment).

When the relative inclination angle θx about the X-axis is an angle that bring the left side of the stewing body 3 closer to the surrounding ground area Gra, the area setting section 32 sets a distance Y2 from the reference point P0 to the left edge of the monitoring area AR based on the formula (4a) or the formula (4b) in the same manner as the above-described case, and sets the distance from the reference point P0 to the right edge of the monitoring area AR to the same value as the distance Y1 associated with the reference area AR1.

As described above, the area setting section 32 determines the dimension of the monitoring area AR in the X-axis direction according to the relative inclination angle θy about the Y-axis and determines the dimension of the monitoring area AR in the Y-axis direction according to the relative inclination angle θx about the X-axis. Thus, the area setting section 32 sets the monitoring area AR to have a size determined based on the relative inclination angles θy and θx.

Figure 5A:
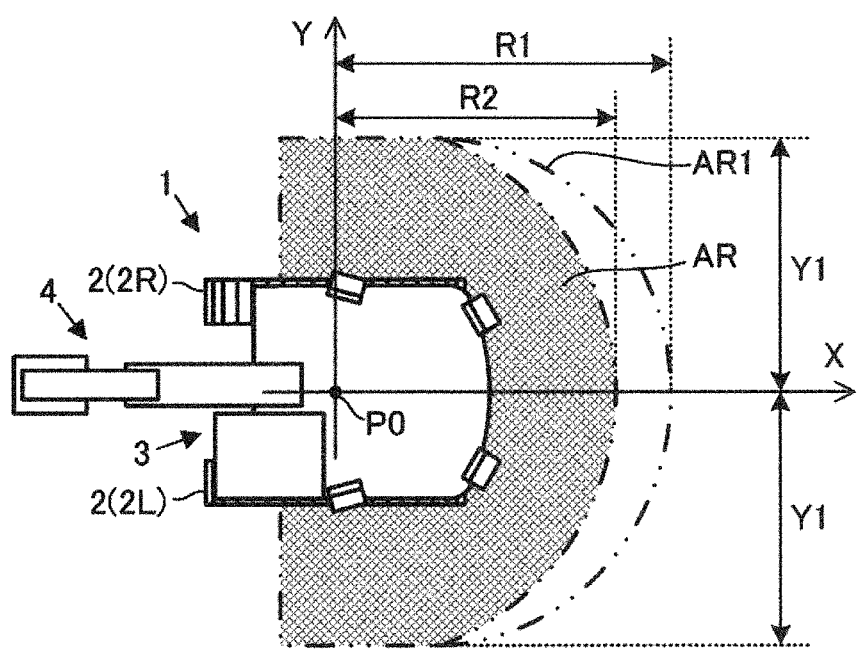
FIG. 5A is a plan view showing a first example of the monitoring area set in the first embodiment.
Figure 5B:
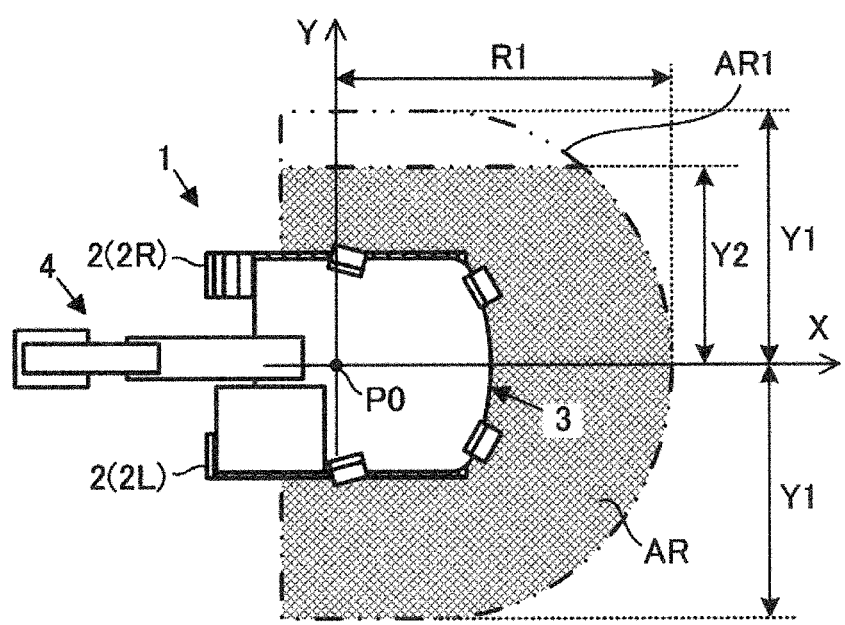
FIG. 5B is a plan view showing a second example of the monitoring area set in the first embodiment.
Figure 5C:
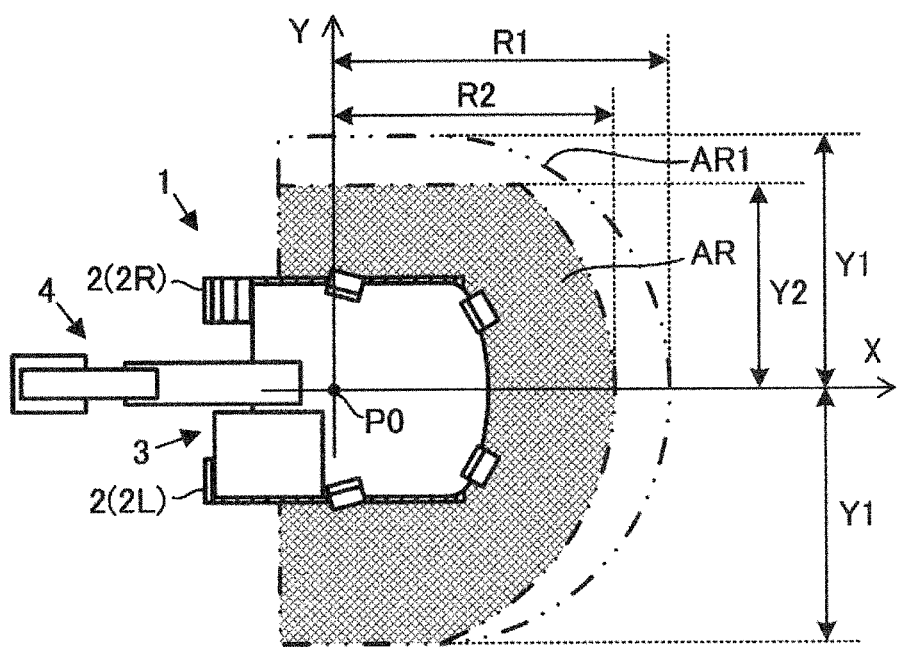
FIG. 5C is a plan view showing a third example of the monitoring area set in the first embodiment.

For example, when r+Dx≤R1 and s+Dy>Y1, the area setting section 32 sets the monitoring area AR to have a shape shown in FIG. 5A, for example, and when r+Dx>R1 and s+Dy≤Y1, the area setting section 32 sets the monitoring area AR to have a shape shown in FIG. 5B, for example. Further, when r+Dx≤R1 and s+Dy≤Y1, the area setting section 32 sets the monitoring area AR to have a shape shown in FIG. 5C, for example.

In other words, when the hydraulic excavator 1 is in a situation in which setting the monitoring area AR to the reference area AR1 is likely to result in inclusion of the surrounding ground area Gra in the reference area AR1, the area setting section 32 sets the monitoring area AR to an area modified from the reference area AR1 so that the surrounding ground area Gra is excluded from the monitoring area AR. Specifically, the monitoring area AR is set to an area that remains when a portion of the reference area AR1 close to the surrounding ground area Gra is removed from the reference area AR1.

The monitoring area AR shown in FIG. 5A has a rear portion formed in an arc; however, the shape of the monitoring area AR is not particularly limited. For example, the rear portion of the monitoring area AR may have a shape obtained by removing from the rear portion of the reference area AR1 a portion located further away (at a greater distance in the X-axis direction) from the reference point P0 than R2. This also applies to the monitoring area AR shown in FIG. 5C.

The minimum distances Dx and Dy according to the first embodiment each correspond to the estimated value of the closest approach distance according to the present invention.

When the slewing body 3 is inclined with respect to the surrounding ground area Gra with the rear portion thereof closer to the surrounding ground area Gra, the rear edge of the slewing body 3 corresponds to the closest approach portion, which is the portion of the outer peripheral surface of the slewing body 3 corresponding to the machine body that is closest to the surrounding ground area Gra, and the distance (=Dx−bx) from the rear edge of the slewing body 3 to the rear edge of the monitoring area AR corresponds to the closest approach distance, which is the distance from the closest approach portion to the outer boundary of the monitoring area AR.

On the other hand, when the slewing body 3 is inclined with respect to the surrounding ground area Gra with the right (or left) side thereof closer to the surrounding ground area Gra, the right (or left) edge of the stewing body 3 corresponds to the closest portion, which is the portion of the outer peripheral surface of the slewing body 3 corresponding to the machine body that is closest to the surrounding ground area Gra, and the distance (=Dy−by) from the right (or left) edge of the slewing body 3 to the right (or left) edge of the monitoring area AR corresponds to the closest approach distance, which is the distance from the closest portion to the outer boundary of the monitoring area AR.

Further, the above-mentioned inequality (2b) set for the case where the slewing body 3 is inclined to a certain degree or more with respect to the surrounding ground area Gra with the rear portion thereof closer to the surrounding ground area Gra and the above-mentioned inequality (4b) set for the case where the slewing body 3 is inclined with respect to the surrounding ground area Gra with the right side or the left side thereof closer to the surrounding ground area Gra each correspond to the inference condition, i.e. a condition for inferring that the monitoring area AR will include at least part of the surrounding ground area Gra.

In the above-described first embodiment, in the case where setting the monitoring area AR to the reference area AR1 is likely to result in exclusion of the surrounding ground area Gra from the reference area AR1, the monitoring area AR is set directly to the reference area AR1. This makes it possible to detect an obstacle in the vicinity of the slewing body 3 based on the monitoring area AR that has an appropriate size and shape.

In contrast, in the case where setting the monitoring area AR to the reference area AR1 is likely to result in inclusion of at least part of the surrounding ground area Gra in the reference area AR1 due to large inclination of the slewing body 3 with respect to the surrounding ground area Gra, the monitoring area AR is set to the area that remains when a portion of the reference area AR1 close to the surrounding ground area Gra is removed from the reference area AR1 so that the surrounding ground area Gra is excluded from the monitoring area AR. This makes it possible to prevent the obstacle detection section 33 from detecting the surrounding ground area Gra as an obstacle. This in turn prevents the obstacle handling processing section 34 from performing the handling processing too frequently.

Now, the second embodiment of the present invention will be described with reference to FIGS. 6 and 7. The second embodiment differs from the first embodiment only in the processing performed by the area setting section 32. Thus, the description given below mainly focuses on such difference and omits features common with the first embodiment.

The area setting section 32 according to the first embodiment sets the monitoring area AR such that the monitoring area AR does not include the portion of the reference area AR1 located further away (at a greater distance in the X-axis direction) from the rear edge of the slewing body 3 than the minimum distance Dx from the rear edge of the slewing body 3 to the surrounding ground area Gra and the portion of the reference area AR1 located further away (at a greater distance in the Y-axis direction) from the right edge or the left edge of the slewing body 3 than the minimum distance Dy from the right edge or the left edge of the slewing body 3 to the surrounding ground area Gra, the excluded portions including a portion outside (a space above) the surrounding ground area Gra.

In contrast, the area setting section 32 according to the second embodiment sets the monitoring area AR such that the monitoring area AR includes a portion of the reference area AR1 that lies outside (a space above) the surrounding ground area Gra as much as possible. Specifically, when at least one of the relative inclination angles about the X-axis and the Y-axis is greater than its respective threshold value equal to the predetermined threshold value according to the first embodiment, the area setting section 32 according to the second embodiment determines the rear boundary of the monitoring area AR according to the estimated value of the relative inclination angle θy about the Y-axis and determines a side boundary of the monitoring area AR according to the estimated value of the relative inclination angle θx about the X-axis.

The operation of determining the rear boundary of the monitoring area AR is performed, for example, as follows. As shown in FIG. 6, when the relative inclination angle θy about the Y-axis is an angle that brings the rear portion of the slewing body 3 closer to the surrounding ground area Gra and the estimation condition specified by the above-mentioned inequality (2b) is satisfied (i.e. r+Dx≤R1), the area setting section 32 sets the rear boundary of the monitoring area AR when the hydraulic excavator 1 is viewed in the Y-axis direction (when the hydraulic excavator 1 is plotted on the ZX-coordinate plane of the slewing body coordinate system) to a line shifted from a line coincident with the surrounding ground area Gra outward of the surrounding ground area Gra by a predetermined distance.

Figure 6:
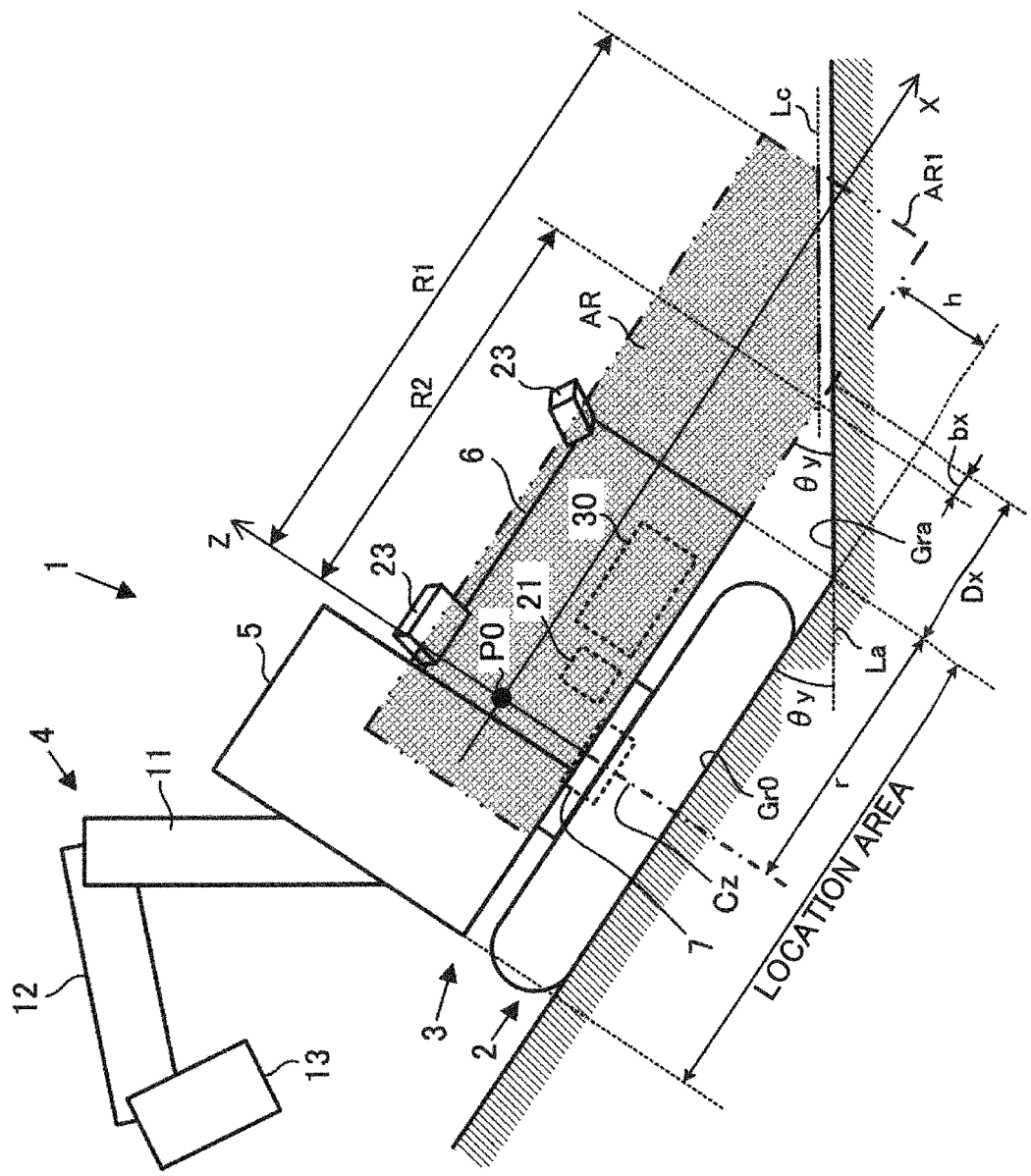
FIG. 6 is a side view showing the monitoring area set in the second embodiment of the present invention.

Specifically, in the example shown in FIG. 6, the area setting section 32 sets the rear boundary of the monitoring area AR to a line Lc that is shifted from the line coincident with the surrounding ground area Gra in the X-axis direction by the margin constant bx. The line Lc (hereinafter also referred to as "boundary line Lc") is represented by the following formula (5) on the ZX-coordinate plane of the slewing body coordinate system with its origin at the reference point P0.

$$Z = (X - R2) \cdot \tan(\theta y) + z0 \qquad (5)$$

In the above formula (5), the symbol R2 represents the value obtained by the above-mentioned formula (2b). The symbol z0 represents the Z-axis coordinate of the lower surface (the lower surface in the Z-axis direction) of the slewing body 3, which is stored in the controller 30 in advance.

The area setting section 32 sets the monitoring area AR as viewed in the Y-axis direction to the portion of the reference area AR1 that satisfies the following inequality (6).

$$Z \geq (X - R2) \cdot \tan(\theta y) + z0 \qquad (6)$$

When the relative inclination angle θy about the Y-axis is an angle that brings the rear portion of the slewing body 3 closer to the surrounding ground area Gra and the estimation condition specified by the above-mentioned inequality (2b) is not satisfied (i.e. r+Dx>R1), or when the relative inclination angle θy about the Y-axis is an angle that brings the rear portion of the slewing body 3 away from the surrounding ground area Gra, the area setting section 32 sets the monitoring area AR as viewed in the Y-axis direction to the same area as the reference area AR1, in the same manner as in the first embodiment.

Figure 7:
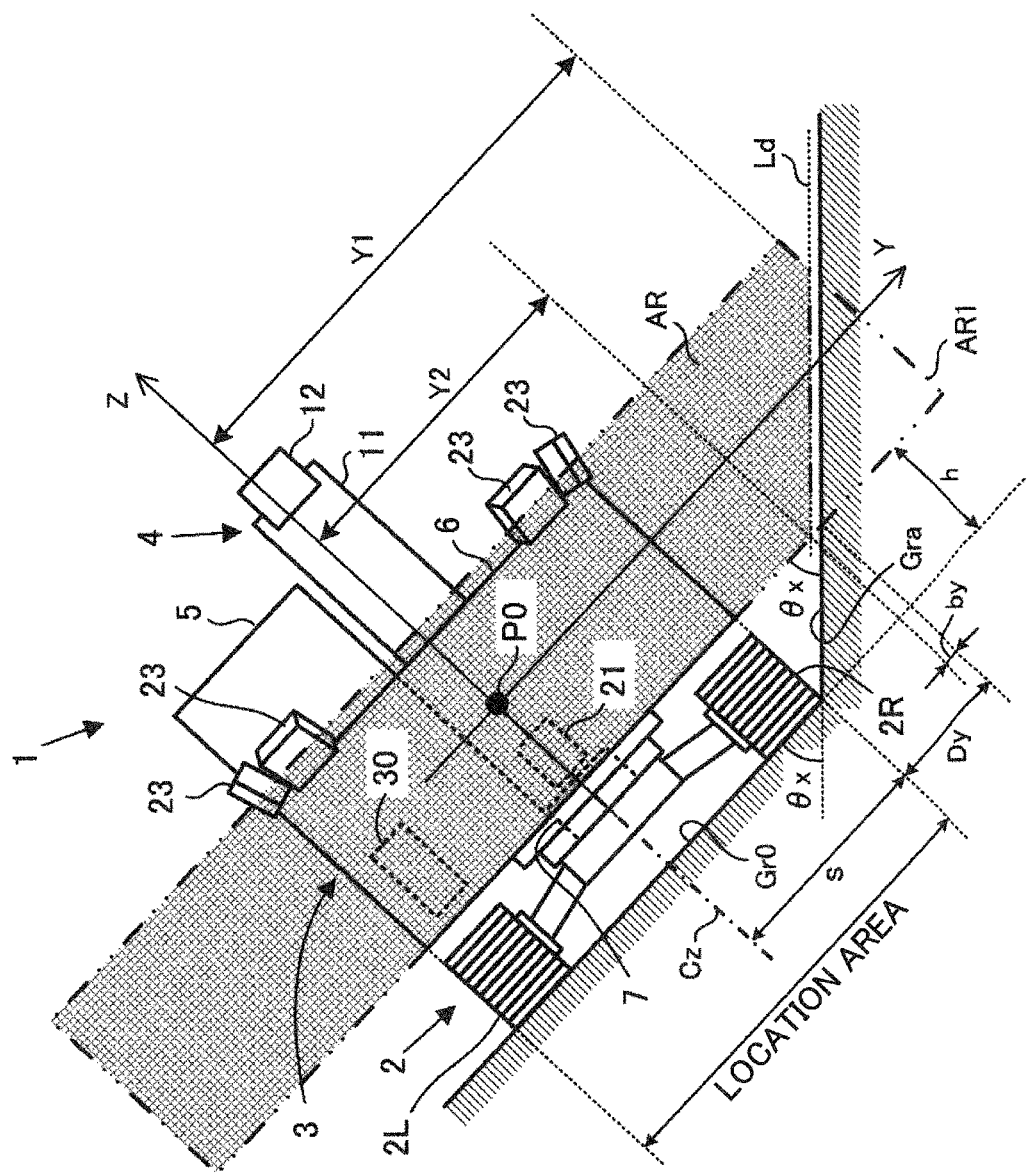
FIG. 7 is a plan view showing the monitoring area shown in FIG. 6.

Further, as shown in FIG. 7, when the relative inclination angle θx about the X-axis is an angle that brings one of the left and right sides, for example, the right side, of the slewing body 3 closer to the surrounding ground area Gra and the inference condition specified by the above-mentioned inequality (4b) is satisfied (i.e. s+Dy≤Y1), the area setting section 32 sets the right boundary of the monitoring area AR when the hydraulic excavator 1 is viewed in the X-axis direction (when the hydraulic excavator 1 is plotted on the YZ-coordinate plane of the slewing body coordinate system) to a line shifted from a line coincident with the surrounding ground area Gra outward of the surrounding ground area Gra by a predetermined distance.

Specifically, in the example shown in FIG. 7, the area setting section 32 sets the right boundary of the monitoring area AR to a line Ld that is shifted from the line coincident with the surrounding ground area Gra in the Y-axis direction by the margin constant by. The line Ld (hereinafter also referred to as "boundary line Ld") is represented by the following formula (7) on the YZ-coordinate plane of the slewing body coordinate system (the slewing body coordinate system with its origin at the reference point P0).

$$Z=(Y-Y2)\cdot\tan(\theta x)+z0 \quad (7)$$

In the above formula (7), the symbol Y2 represents the value obtained by the above-mentioned formula (4b). The symbol z0 represents the Z-axis coordinate of the lower surface (the lower surface in the Z-axis direction) of the slewing body 3, similarly to that in the formula (5).

The area setting section 32 sets the monitoring area AR as viewed in the X-axis direction to the portion of the reference area AR1 that satisfies the following inequality (8).

$$Z\geq(Y-Y2)\cdot\tan(\theta x)+z0 \quad (8)$$

Also when the relative inclination angle θx about the X-axis is an angle that brings the left side of the slewing body 3 closer to the surrounding ground area Gra and the estimation condition specified by the above-mentioned inequality (4b) is satisfied (i.e. s+Dy≤Y1), the area setting section 32 sets the monitoring area AR as viewed in the X-axis direction in the same manner as in the above-described case.

When the stewing body 3 is inclined left or right to the surrounding ground area Gra but the estimation condition specified by the above-mentioned inequality (4b) is not satisfied (i.e. s+Dy>Y1), the area setting section 32 sets the monitoring area AR as viewed in the X-axis direction to the same area as the reference area AR1, in the same manner as in the first embodiment.

As described above, when it is likely that the reference area AR1 will include the surrounding ground area Gra, the area setting section 32 according to the second embodiment determines the rear boundary line Lc of the monitoring area AR as viewed in the Y-axis direction according to the relative inclination angle θy about the Y-axis and determines the side boundary line Ld of the monitoring area AR as viewed in the X-axis direction according to the relative inclination angle θx about the X-axis. These boundary lines Lc and Ld are each shifted a predetermined distance from the surrounding ground area Gra and extend in parallel to the surrounding ground area Gra.

Subsequently, the area setting section 32 sets the portion of the reference area AR1 located above the boundary lines Lc and/or Ld as the monitoring area AR. For example, when r+Dx≤R1 and s+Dy>Y1, the area setting section 32 sets the monitoring area AR to the portion of the reference area AR1 that satisfies the condition specified by the inequality (6), and when r+Dx≥R1 and s+Dy≤Y1, the area setting section 32 sets the monitoring area AR to the portion of the reference area AR1 that satisfies the condition specified by the inequality (8). On the other hand, when r+Dx≤R1 and s+Dy≤Y1, the area setting section 32 sets the monitoring area AR to the portion of the reference area AR1 that satisfies both inequalities (6) and (8).

Thus, the monitoring area AR is set such that each of the portions of the monitoring area AR close to the surrounding ground area Gra as viewed in the Y-axis direction and the X-axis direction has a shape similar to the shape that remains when the portion of the reference area AR1 that overlaps the surrounding ground area Gra (the portion lying within the surrounding ground area Gra) is removed from the reference area AR1.

Setting each of the margin constants bx and by to a sufficiently small value makes it possible to set the monitoring area AR such that the each of the portions of the monitoring area AR close to the surrounding ground area Gra as viewed in the Y-axis direction and the X-axis direction has a shape substantially the same as the shape that remains when the portion of the reference area AR1 that overlaps the surrounding ground area Gra (the portion that lies within the surrounding ground area Gra) is removed from the reference area AR1.

The second embodiment of the present invention is the same as the first embodiment except for the points described above and provides the same advantageous effects as those of the first embodiment. In addition, the second embodiment makes it possible, when setting the monitoring area AR to the reference area AR1 is likely to result in inclusion of the surrounding ground area Gra in the monitoring area AR, to set the monitoring area AR such that the monitoring area AR does not include the surrounding ground area Gra but includes the portion of the reference area AR1 that lies outside the surrounding ground area Gra as much as possible.

This makes it possible, while preventing the obstacle detection section 33 from detecting the surrounding ground area Gra as an obstacle, to allow the obstacle detection section 33 to detect a real obstacle other than the surrounding ground area Gra in the same manner as in the case where the monitoring area AR has been set to the reference area AR1. This thus makes it possible to effectively prevent failure to detect an obstacle.

Now, a third embodiment of the present invention will be described. The third embodiment differs from the first embodiment or the second embodiment only in the processing performed by the inclination information acquisition section 31. Thus, the description given below mainly focuses on such difference and omits features common with the first embodiment or the second embodiment.

The inclination information acquisition section 31 according to the third embodiment is configured to be able to obtain an estimated value of relative inclination that is inclination information indicating a state of relative inclination of the hydraulic excavator 1 with respect to the surrounding ground area Gra even when the operational environmental ground area varies in its inclination.

Specifically, the inclination information acquisition section 31 according to the third embodiment obtains, for example, each time the chassis 2 moves a predetermined distance unit during its travel, detection data included in the inclination detection signal indicating current inclination of the slewing body 3 generated by the inclination sensor 21, detection data indicating a current sleeving angle of the slewing body 3 generated by the slewing angle sensor 22, and detection data indicating a current travel direction of the chassis 2, and stores each combination of these detection data chronologically. The current travel direction of the chassis 2 can be detected using, for example, a reception signal from a GNSS (Global Navigation Satellite System).

The inclination information acquisition section 31 calculates, based on newly obtained detection data and the detection data obtained at the preceding acquisition time (or the detection data obtained over the preceding plurality of acquisition times) about the inclination angle, the slewing angle, and the travel direction, the estimated value of the amount of change in the inclination of the slewing body 3. The inclination information acquisition section 31 then obtains the calculated estimated value as the estimated value of the relative inclination. The amount of change in the inclination is an amount of change that occurs in a moving path of the chassis 2 immediately preceding its current position and is an amount of change in the slewing coordinate system corresponding to the current slewing angle of the slewing body 3.

The third embodiment is the same as the first embodiment or the second embodiment except for the points described above. The third embodiment makes it possible to provide the same advantageous effects as those of the first embodiment or the second embodiment. In addition, the third embodiment makes it possible to estimate the relative inclination of the slewing body 3 with respect to the surrounding ground area Gra with high reliability even when the operational environmental ground area, which is an area of the ground serving as the operational environment of the hydraulic excavator 1, varies in its inclination. This makes it possible to set the monitoring area AR to have a shape that conforms to the actual shape of the operational environmental ground area.

Now, a fourth embodiment of the present invention will be described with reference to FIG. 8. The fourth embodiment differs from the first embodiment or the second embodiment only in the processing performed by the inclination information acquisition section 31. Thus, the description given below mainly focuses on such difference and omits features common with the first embodiment or the second embodiment.

Figure 8:
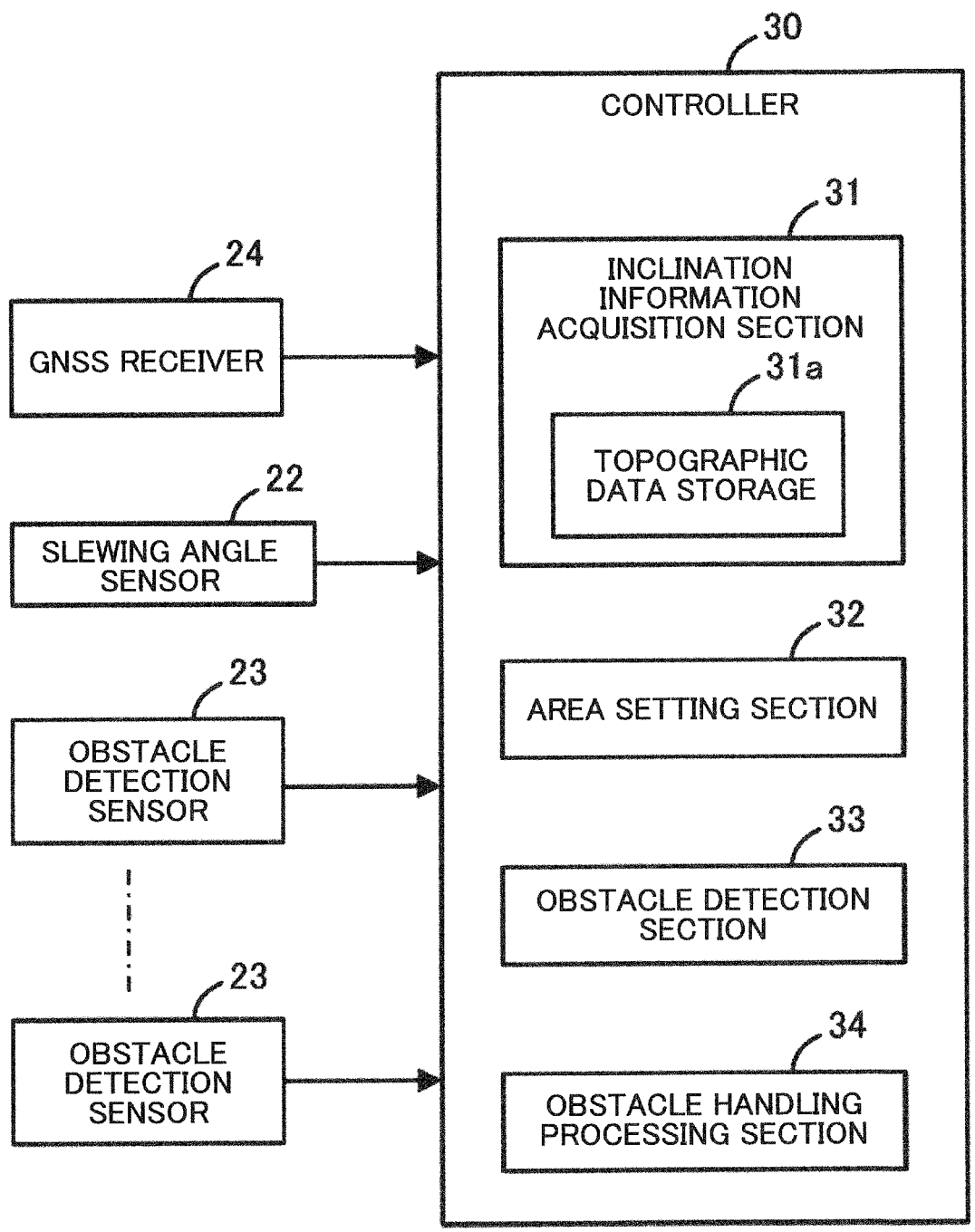
FIG. 8 is a block diagram of an obstacle detection device according to the fourth embodiment of the present invention.

The hydraulic excavator 1 according to the fourth embodiment includes, instead of the inclination sensor 21, a GNSS receiver 24 mounted thereon, as shown in FIG. 8. The GNSS receiver 24 receives a GNSS signal indicating a position and a moving speed of the hydraulic excavator 1 and inputs the signal to the controller 30.

The inclination information acquisition section 31 of the controller 30 includes a topographic data storage 31a for storing topographic data that is three-dimensional data indicating the landform of the operational environmental ground area. The topographic data can be downloaded as needed to the controller 30 from, for example, an external server of the hydraulic excavator 1.

The inclination information acquisition section 31 identifies a current position of the hydraulic excavator 1 and travel direction of the chassis 2 (facing direction of the chassis 2) based on the GNSS signal input from the GNSS receiver 24 in each predetermined arithmetic processing cycle. The inclination information acquisition section 31 then estimates, based on the current position and travel direction, the topographic data, and the detected value of a current slewing angle of the slewing body 3, the relative inclination of the slewing body 3 with respect to the surrounding ground area Gra of the hydraulic excavator 1 at a current position (the relative inclination viewed in the slewing body coordinate system that corresponds to the current slewing angle of the slewing body 3).

The fourth embodiment is the same as the first embodiment or the second embodiment except for the points described above. Thus, the fourth embodiment makes it possible to provide the same advantageous effects as those of the first embodiment or the second embodiment. In addition, the fourth embodiment makes it possible to estimate the relative inclination of the slewing body 3 with respect to the surrounding ground area Gra when the hydraulic excavator 1 is at any position, regardless of the landform of the operational environment of the hydraulic excavator 1, with high reliability. This makes it possible to set the monitoring area AR to have a shape that conforms to the actual shape of the operational environmental ground area.

In the first to fourth embodiments described above, the area of the ground occupied by the whole of the slewing body 3 as viewed in the direction of the Mewing axis Cz is considered as the location area of the hydraulic excavator 1. However, the location area is not limited to this area. For example, either the area of the ground occupied by the whole of the slewing body 3 as viewed in the direction of the slewing axis Cz or an area of the ground occupied by the whole of the slewing body 3 and the chassis 2 as viewed in the direction of the slewing axis Cz may be considered as the location area of the hydraulic excavator 1.

In the first to fourth embodiments described above, the size and boundary of the monitoring area AR when the hydraulic excavator 1 is viewed in the Y-axis direction and the X-axis direction are determined independently for each direction. However, the determination method is not limited to a particular method. For example, it is also possible to identify a three-dimensional plane approximate to the surrounding ground area Gra viewed in the slewing coordinate system based on the estimated value of relative inclination and, if the three-dimensional plane is included in the spatial area (the three-dimensional area) of the reference area AR1, determine the spatial shape and size of the monitoring area AR such that the three-dimensional plane is excluded from the spatial area (the three-dimensional area) of the monitoring area AR.

The present invention is not necessarily applied to a construction machine in the form of a hydraulic excavator. The present invention can be widely applied to various types of construction machines that require detection of an obstacle in the vicinity of the machine body. Further, the machine body, to which the present invention is applied, is not necessarily of a type configured to slew with respect to the chassis of the construction machine. For example, the machine body may be fixed to a frame of the chassis.

In the first to fourth embodiments described above, the plurality of obstacle detection sensors 23 are mounted on the hydraulic excavator 1 (the construction machine) as object detectors for detecting an object in the vicinity of the machine body. However, such object detectors may alternatively be in the form of external sensors, such as cameras, installed outside the construction machine.

Further, at least part of the processing of the controller 30 may be performed by an external computer installed outside the hydraulic excavator 1 (the construction machine), for example.

As described above, there is provided an obstacle detection device capable of detecting an obstacle in the vicinity of a machine body of a construction machine and performing handling processing corresponding to a result of the detection, the device enabling proper detection of the obstacle that takes into account the state of inclination of the construction machine with respect to its surrounding ground area. Provided is an obstacle detection device for detecting an obstacle in the vicinity of a machine body of a construction machine and performing handling processing according to a result of the detection, the device comprising: an inclination information acquisition section configured to obtain inclination information that is information about a state of relative inclination of the machine body with respect to a surrounding ground area that is an area of the ground extending in the vicinity of a location ground area that is an area of the ground on which the construction machine is located; an area setting section configured to set a monitoring area in the vicinity of the machine body; an obstacle detection section configured to detect an obstacle within the monitoring area; and a handling processing section configured to perform predetermined handling processing upon detection of the obstacle by the obstacle detection section, wherein the area setting section is configured to modify the monitoring area according to the inclination information.

The area setting section of the obstacle detection device modifies the monitoring area according to the inclination information, thereby making it possible to set the monitoring area such that the surrounding ground area is excluded from the monitoring area. In other words, the area setting section is capable of modifying the monitoring area according to the inclination information in such a manner as to reduce the portion of the surrounding ground area included in the monitoring area. Such modification of the monitoring area makes it possible to prevent the obstacle detection section from detecting the surrounding ground area as an obstacle and, in turn, prevent excessive performance of the handling processing. In other words, the area setting section is capable of appropriately setting the monitoring area for detecting an obstacle in the vicinity of the machine body of the construction machine in consideration of the state of inclination of the construction machine with respect to the surrounding ground area.

The area setting section is preferably configured to, in a first case where the inclination information indicates no inclination of the machine body with respect to the surrounding ground area, set the monitoring area to a predetermined reference area and, in a second case where the inclination information indicates that the machine body is inclined with respect to the surrounding ground area to a certain degree or more, if a predetermined inference condition for inferring that setting the monitoring area to the reference area will result in inclusion of at least part of the surrounding ground area in the monitoring area is satisfied, change the monitoring area to an area that remains when a portion of the reference area close to the surrounding ground area is removed from the reference area so that the surrounding ground area is excluded from the set monitoring area, and if the inference condition fails to be satisfied, set the monitoring area to the reference area.

When the inference condition is satisfied in the second case, the area setting section sets the monitoring area to the area that remains when the portion of the reference area close to the surrounding ground area is removed from the reference area. This makes it possible to prevent inclusion of the surrounding ground area in the monitoring area, regardless of the inclination of the construction machine with respect to the surrounding ground area. Consequently, it is possible to prevent the obstacle detection section from detecting the surrounding ground area as an obstacle and, in turn, appropriately prevent the handling processing section from performing the handling processing excessively. On the other hand, the monitoring area is set to coincide with the portion of the reference area other than the portion close to the surrounding ground area. This makes it possible to secure an area suitable for detecting an obstacle.

The area setting section is preferably configured to, when the inference condition is satisfied in the second case, estimate a closest approach distance from a closest approach portion that is a portion of an outer peripheral surface of the machine body closest to the surrounding ground area to the surrounding ground area and set the monitoring area such that a distance from the closest approach portion to an outer boundary of the monitoring area is less than the estimated value of the closest approach distance.

Such setting of the monitoring area makes it possible to prevent inclusion of the surrounding ground area in the monitoring area with high reliability.

The closest approach portion may be a portion of the outer peripheral surface of the machine body closest to the surrounding ground area in terms of the spatial relative position, or may be a portion of the periphery of the machine body closest to the surrounding ground area when the machine body is viewed in a certain direction (when the machine body is viewed on a plane orthogonal to the certain direction).

The area setting section is preferably configured to, when the inference condition is satisfied in the second case, set the monitoring area such that a portion of the monitoring area close to the surrounding ground area has a shape the same as or similar to a shape that remains when a portion of the reference area that overlaps the surrounding ground area is removed from the reference area. This makes it possible to reduce the portion of the reference area that is excluded from the monitoring area as much as possible, thereby making it possible to secure a large monitoring area for properly detecting an obstacle in the vicinity of the machine body (a real obstacle other than the surrounding ground area).

The inclination information acquisition section is preferably configured to obtain the inclination information based on an inclination detection signal generated by an inclination sensor mounted on the construction machine in such a way as to be able to detect inclination angles of the machine body about two different axes. This makes it possible to easily obtain the inclination information suitable for properly detecting the obstacle using the inclination sensor.

Alternatively, the inclination information acquisition section may be configured to obtain topographic data that is data indicating a landform of an operational environment of the construction machine and positional information that is information about a position of the construction machine, and obtains the inclination information based on at least the topographic data and the positional information. This makes it possible to obtain the proper inclination information using the topographic data, regardless of the position of the construction machine.

The invention claimed is:

1. An obstacle detection device for detecting an obstacle in the vicinity of a machine body of a construction machine and performing handling processing according to a result of the detection, the device comprising:

an inclination information acquisition section configured to obtain inclination information that is information about a state of relative inclination of the machine body with respect to a surrounding ground area that is an area of the ground extending in the vicinity of a location ground area that is an area of the ground on which the construction machine is located;

an area setting section configured to set a monitoring area in the vicinity of the machine body;

an obstacle detection section configured to detect an obstacle within the monitoring area; and a handling processing section configured to perform predetermined handling processing upon detection of the obstacle by the obstacle detection section, wherein the area setting section is configured to modify the monitoring area according to the inclination information.

2. The obstacle detection device for a construction machine according to claim 1, wherein the area setting section is configured to, in a first case where the inclination information indicates no inclination of the machine body with respect to the surrounding ground area, set the monitoring area to a predetermined reference area and, in a second case where the inclination information indicates that the machine body is inclined with respect to the surrounding ground area to a certain degree or more, if a predetermined inference condition for inferring that setting the monitoring area to the reference area will result in inclusion of at least part of the surrounding ground area in the monitoring area is satisfied, change the monitoring area to an area that remains when a portion of the reference area close to the surrounding ground area is removed from the reference area so that the surrounding ground area is excluded from the set monitoring area, and if the inference condition fails to be satisfied, set the monitoring area to the reference area.

3. The obstacle detection device for a construction machine according to claim 2, wherein the area setting section is configured to, when the inference condition is satisfied in the second case, estimate a closest approach distance from a closest approach portion that is a portion of an outer peripheral surface of the machine body closest to the surrounding ground area to the surrounding ground area and set the monitoring area such that a distance from the closest approach portion to an outer boundary of the monitoring area is less than the estimated value of the closest approach distance.

4. The obstacle detection device for a construction machine according to claim 2, wherein the area setting section is configured to, when the inference condition is satisfied in the second case, set the monitoring area such that a portion of the monitoring area close to the surrounding ground area has a shape the same as or similar to a shape that remains when a portion of the reference area that overlaps the surrounding ground area is removed from the reference area.

5. The obstacle detection device for a construction machine according to claim 1, wherein the inclination information acquisition section is configured to obtain the inclination information based on an inclination detection signal generated by an inclination sensor mounted on the construction machine in such a way as to be able to detect inclination angles of the machine body about two different axes.

6. The obstacle detection device for a construction machine according to claim 1, wherein the inclination information acquisition section is configured to obtain topographic data that is data indicating a landform of an operational environment of the construction machine and positional information that is information about a position of the construction machine, and obtains the inclination information based on at least the topographic data and the positional information.

* * * * *